US012602459B2

(12) United States Patent
Prégniard et al.

(10) Patent No.: US 12,602,459 B2
(45) Date of Patent: Apr. 14, 2026

(54) SYSTEMS AND METHODS FOR CHATBOT AUTHENTICATION

(71) Applicant: LexisNexis Risk Solutions, Inc., Alpharetta, GA (US)

(72) Inventors: Lancelot Prégniard, Paris (FR); Sharfaraz Salek, New York, NY (US); Yaniv Koss, Tel-Aviv (IL); Peter Greene, Pompano Beach, FL (US); Philip Michael Flynn, Dayton, OH (US)

(73) Assignee: LexisNexis Risk Solutions, Inc., Alpharetta, GA (US)

( * ) Notice: Subject to any disclaimer, the term of this patent is extended or adjusted under 35 U.S.C. 154(b) by 31 days.

(21) Appl. No.: 18/913,230

(22) Filed: Oct. 11, 2024

(65) Prior Publication Data

US 2025/0148063 A1     May 8, 2025

Related U.S. Application Data

(60) Provisional application No. 63/653,337, filed on May 30, 2024, provisional application No. 63/596,986, filed on Nov. 8, 2023.

(51) Int. Cl.
| | |
|---|---|
| *G06F 21/00* | (2013.01) |
| *G06F 21/31* | (2013.01) |
| *H04L 51/02* | (2022.01) |

(52) U.S. Cl.
CPC .............. *G06F 21/31* (2013.01); *H04L 51/02* (2013.01); *G06F 2221/2103* (2013.01); *G06F 2221/2135* (2013.01)

(58) Field of Classification Search
CPC ............. G06F 21/31; G06F 2221/2103; G06F 2221/2135; G06F 21/316; H04L 51/02
See application file for complete search history.

(56) References Cited

U.S. PATENT DOCUMENTS

| | | | | |
|---|---|---|---|---|
| 8,401,522 B2 * | 3/2013 | Crawford | ............... | G06F 21/31 |
| | | | | 455/410 |
| 2004/0123162 A1 * | 6/2004 | Antell | ..................... | H04L 63/08 |
| | | | | 726/5 |

(Continued)

OTHER PUBLICATIONS

Human web-collecting data in a socially responsible manner. Tech @ Cliqz. (n.d.). https://0x65.dev/blog/2019-12-03/human-web-collecting-data-in-a-socially-responsible-manner.html (Year: 2019).*

*Primary Examiner* — Kendall Dolly
(74) *Attorney, Agent, or Firm* — TROUTMAN PEPPER LOCKE LLP; James E. Schutz; Mark Lehi Jones

(57) ABSTRACT

Systems and methods for a chatbot authentication system and process that may utilize a large language model (LLM) and state of the art generative natural language processing (NLP) to generate and/or interpret user answers questions generated based on comprehensive known data about the user. The questions can include skills-based and/or knowledge-based queries which may be open ended questions. The user answers provided may be evaluated for accuracy and completeness. Iterative and/or follow-up questions may be generated and posed to allow the user to provide clarifications or additional details. By virtue of the LLM and NLP, the systems and methods disclosed herein may understand the semantical meaning of the answers provided by the user, which can enable a more accurate, user friendly and secure authentication process.

20 Claims, 14 Drawing Sheets

(56)                     References Cited

U.S. PATENT DOCUMENTS

| | | | |
|---|---|---|---|
| 2009/0276839 A1* | 11/2009 | Peneder | G06F 21/31 |
| | | | 726/8 |
| 2013/0191898 A1* | 7/2013 | Kraft | G06F 21/31 |
| | | | 726/6 |
| 2018/0242149 A1* | 8/2018 | Verma | H04L 63/08 |
| 2021/0056186 A1* | 2/2021 | Nygate | G06N 5/04 |
| 2021/0142343 A1* | 5/2021 | Gardner | G06F 40/20 |
| 2024/0086501 A1* | 3/2024 | Osborn | G06F 21/31 |
| 2025/0097346 A1* | 3/2025 | Albero | H04M 3/436 |
| 2025/0117462 A1* | 4/2025 | Marra, Jr. | H04L 63/083 |
| 2025/0252164 A1* | 8/2025 | Gu | G06F 21/31 |

* cited by examiner

Profiling Result

```
    "bb_assessment": "131.33",
    "bb_assessment_rating": "low",
    "bb_bot_rating": "very_low",
    "bb_bot_score": "426.00",
    "bb_fraud_rating": "neutral",
    "bb_fraud_score": "484.52",
    "bb_reason_code": [
        "possible social engineering",
```

FIG. 4

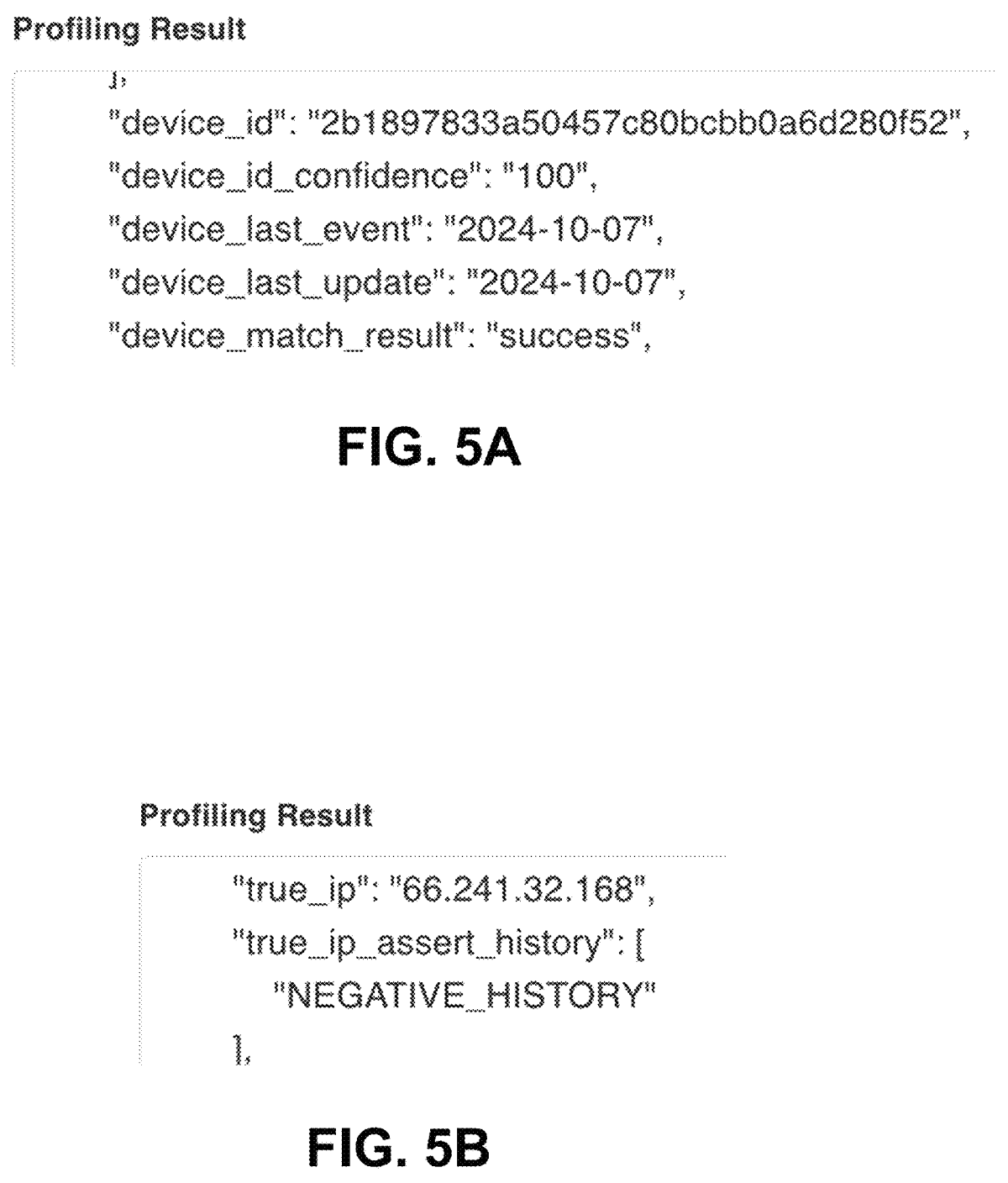

Profiling Result

{
    "device_id": "2b1897833a50457c80bcbb0a6d280f52",
    "device_id_confidence": "100",
    "device_last_event": "2024-10-07",
    "device_last_update": "2024-10-07",
    "device_match_result": "success",

FIG. 5A

Profiling Result

"true_ip": "66.241.32.168",
    "true_ip_assert_history": [
        "NEGATIVE_HISTORY"
    ],

Explain what your PHD was about.

*(Test mode) Answer: Subject: The subject of this PhD research is in the field of quantum computing, focusing on the development of quantum algorithms for optimization problems Observations: Through extensive analysis and simulation, we have observed that quantum computers have the potential to outperform classical computers in solving complex optimization problems These observations are rooted in the unique properties of quantum bits (qubits) and their ability to explore multiple solution paths simultaneously Experiments: A series of experiments were conducted to validate the theoretical findings These experiments involved implementing quantum algorithms on state-of-the-art quantum hardware and comparing the results to classical counterparts The experiments demonstrated a significant advantage in terms of computational efficiency for quantum approaches Contributions: The primary contributions of this research lie in the formulation of novel quantum algorithms tailored for optimization tasks, along with a detailed analysis of their performance characteristics Furthermore, this work offers insights into the practical applications of quantum computing in fields like logistics, finance, and artificial intelligence The findings have the potential to revolutionize problem-solving strategies and inspire further exploration of quantum computing's practicality in real-world scenarios*

904

```
The PHD was about quantum computing and how
quantum algorithms are better than traditional
ones.
```

906

Submit Answer

910

912

Your answer is incomplete. Please provide the Observations, Experiments, Contributions

FIG. 9

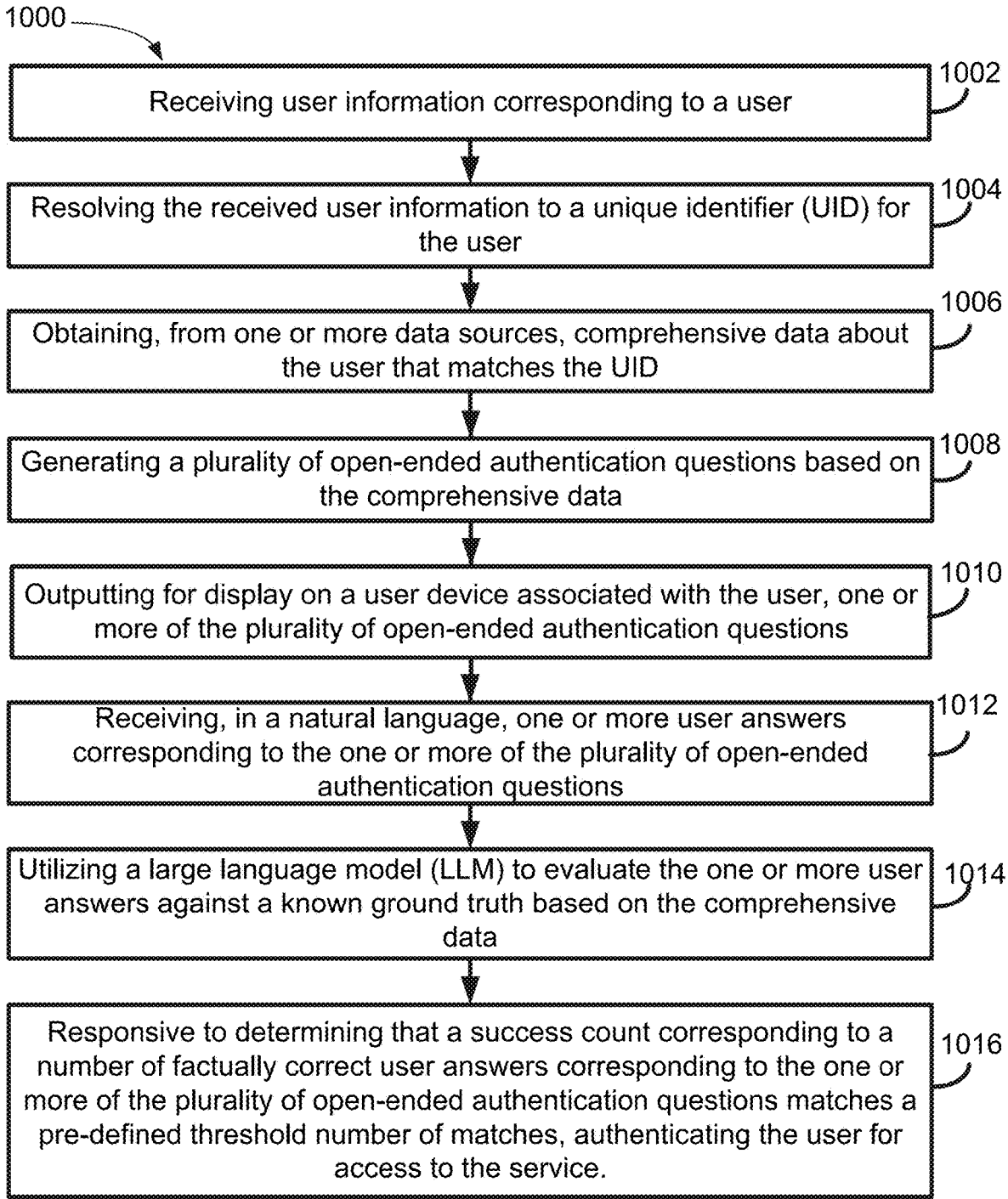

1000

Receiving user information corresponding to a user ⎦1002

Resolving the received user information to a unique identifier (UID) for the user ⎦1004

Obtaining, from one or more data sources, comprehensive data about the user that matches the UID ⎦1006

Generating a plurality of open-ended authentication questions based on the comprehensive data ⎦1008

Outputting for display on a user device associated with the user, one or more of the plurality of open-ended authentication questions ⎦1010

Receiving, in a natural language, one or more user answers corresponding to the one or more of the plurality of open-ended authentication questions ⎦1012

Utilizing a large language model (LLM) to evaluate the one or more user answers against a known ground truth based on the comprehensive data ⎦1014

Responsive to determining that a success count corresponding to a number of factually correct user answers corresponding to the one or more of the plurality of open-ended authentication questions matches a pre-defined threshold number of matches, authenticating the user for access to the service. ⎦1016

FIG. 10

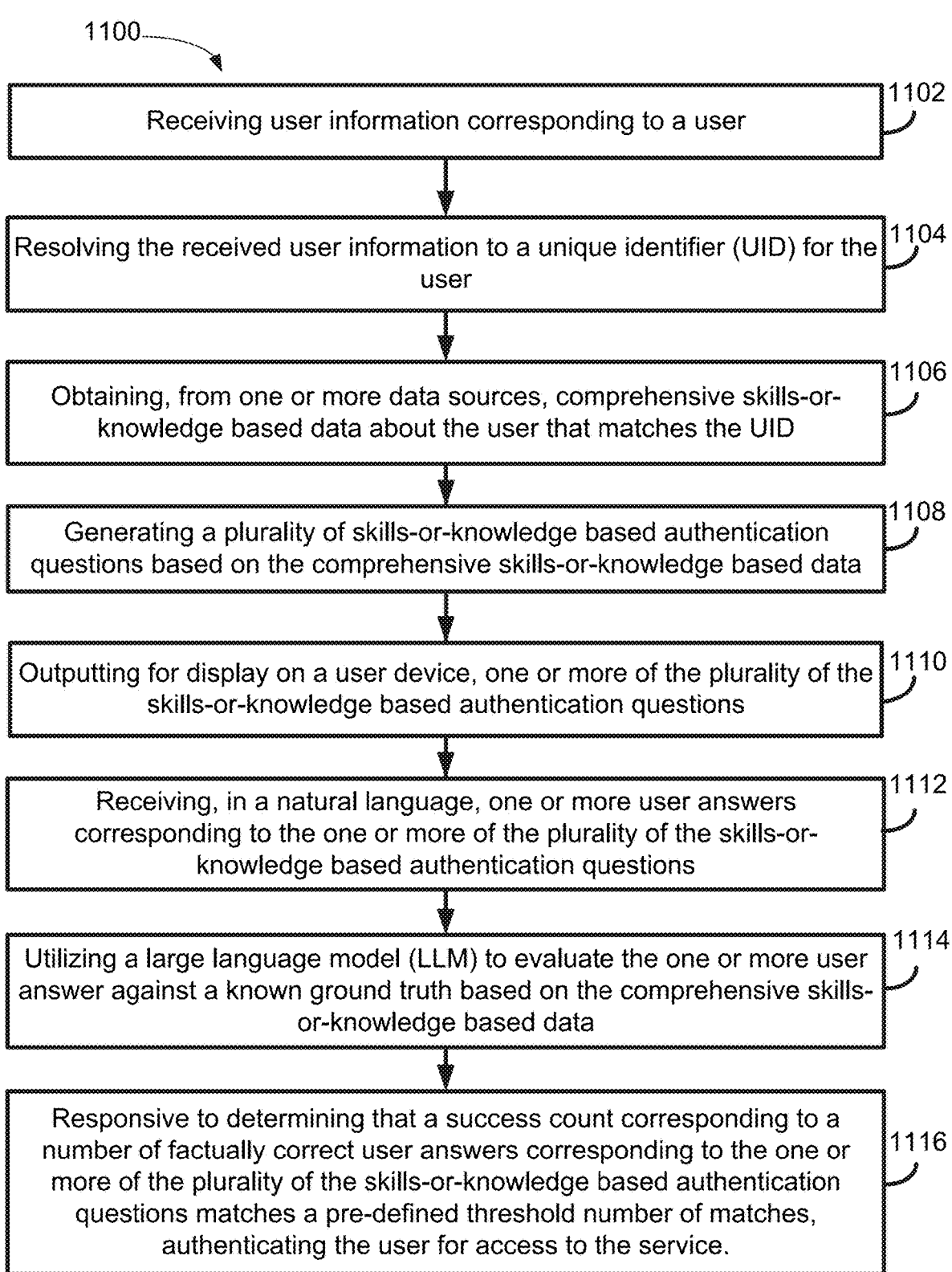

1100

1102
Receiving user information corresponding to a user

1104
Resolving the received user information to a unique identifier (UID) for the user 1106
Obtaining, from one or more data sources, comprehensive skills-or-knowledge based data about the user that matches the UID 1108
Generating a plurality of skills-or-knowledge based authentication questions based on the comprehensive skills-or-knowledge based data 1110
Outputting for display on a user device, one or more of the plurality of the skills-or-knowledge based authentication questions 1112
Receiving, in a natural language, one or more user answers corresponding to the one or more of the plurality of the skills-or-knowledge based authentication questions 1114
Utilizing a large language model (LLM) to evaluate the one or more user answer against a known ground truth based on the comprehensive skills-or-knowledge based data 1116
Responsive to determining that a success count corresponding to a number of factually correct user answers corresponding to the one or more of the plurality of the skills-or-knowledge based authentication questions matches a pre-defined threshold number of matches, authenticating the user for access to the service.

FIG. 11

SYSTEMS AND METHODS FOR CHATBOT AUTHENTICATION

CROSS-REFERENCE TO RELATED APPLICATIONS

This application claims priority under 35 U.S.C. 119 to U.S. Provisional Patent Application No. 63/596,986 entitled "Systems and Methods for Chatbot Authentication," filed 8 Nov. 2023. This application also claims priority under 35 U.S.C. 119 to U.S. Provisional Patent Application No. 63/653,337 entitled "Systems and Methods for Chatbot Authentication," filed 30 May 2024. The contents of each of the above-referenced applications are incorporated herein by reference in their entirety as if fully set forth herein.

FIELD

The disclosed technology generally relates to secure communications and, more particularly, to chatbot authentication systems and methods for verifying the identity of a user.

BACKGROUND

Communications between individuals, organizations, and devices have become increasingly dependent on electronic telecommunication and data storage, which have associated risks such as unauthorized access and data/identity theft. It is therefore necessary to implement robust security measures to protect sensitive data from unauthorized access.

One common method of ensuring secure communication and data exchange is authentication by verifying the identity of a user or entity before granting access to a resource or system. There are many traditional techniques for user authentication, including passwords, biometrics, tokens, certificates, knowledge-based authentication (KBA), etc. However, such traditional methods have certain vulnerabilities and limitations.

In a traditional KBA process during enrollment, a user may be presented with (or may select) a series of security questions and the user may enter custom answers to the security questions. Then, during the authentication phase, the user may be presented with one or more of the previous security questions, and the user may be required to enter the same text (with spelling, punctuation, content, etc.) as was entered when the user previously answered the question(s) during enrollment. Such existing implementations of this conventional process can have significant drawbacks. For example, the user may forget the specific format in which they provided their answers, such as spelling or abbreviations, which can make it difficult for them to provide the same answer in the future. Additionally, it is known that many users do not provide genuine answers, instead opting for irrelevant or even profane responses that are non-ideal for authentication purposes.

Traditional KBA methods typically also require a user to answer a pre-configured quiz with multiple-choice answers. Such multiple-choice quiz-based authentication methods have vulnerabilities that can be exploited by fraudsters to gain access to a victim's account. For example, KBA may display the victim's correct answer to the fraudster, who may compile such information about the victim's identity through repeated quiz attempts and use such information to pass the authentication. By guessing alone, an unauthorized user can choose the correct answer with a 20%-25% probability per question. Furthermore, certain questions related to data in public records, such as previous addresses, vehicles etc., can be researched by a fraudster to increase their success in overcoming the authentication step.

The traditional authentication methods discussed above lack accuracy in determining the user's identity, do not have the ability to engage in a natural conversation, do not have the ability to assist the user with missing or partial memory of the answers, and can be vulnerable to fraudulent activities. Therefore, there is a need for an improved authentication technique that can address the shortcomings of the conventional solutions.

BRIEF SUMMARY

Some or all of the above needs may be addressed by certain implementations of the disclosed technology. Systems and methods are disclosed herein for implementing a chatbot authentication process that may utilize a large language model (LLM) and state of the art generative natural language processing (NLP) to interpret open-ended answers based on known data about the user. The answers provided may be evaluated for accuracy and completeness, and iterative and/or follow-up questions may be generated and posed to allow the user to provide clarifications or additional details. The systems and methods disclosed herein may understand the semantical meaning of the answers provided by the user, which can enable a more accurate, user friendly and secure authentication process.

In an example implementation, a computer-implemented method is disclosed for user authentication for access to a service using a chatbot. The method can include receiving user information corresponding to a user; resolving the received user information to a unique identifier (UID) for the user; obtaining, from one or more data sources, comprehensive data about the user that matches the UID; generating a plurality of open-ended authentication questions based on the comprehensive data; outputting for display on a user device associated with the user, one or more of the plurality of open-ended authentication questions; receiving, in a natural language, one or more user answers corresponding to the one or more of the plurality of open-ended authentication questions; utilizing a large language model (LLM) to evaluate the one or more user answers against a known ground truth based on the comprehensive data; and responsive to determining that a success count corresponding to a number of factually correct user answers corresponding to the one or more of the plurality of open-ended authentication questions matches a pre-defined threshold number of matches, authenticating the user for access to the service.

In another example implementation, a computer-implemented method is disclosed for user authentication for access to a service using a chatbot. The method can include receiving user information corresponding to a user; resolving the received user information to a unique identifier (UID) for the user; obtaining, from one or more data sources, comprehensive skills-or-knowledge based data about the user that matches the UID; generating a plurality of skills-or-knowledge based authentication questions based on the comprehensive skills-or-knowledge based data; outputting for display on a user device, one or more of the plurality of the skills-or-knowledge based authentication questions; receiving, in a natural language, one or more user answers corresponding to the one or more of the plurality of the skills-or-knowledge based authentication questions; utilizing a large language model (LLM) to evaluate the one or more user answer against a known ground truth based on the comprehensive skills-or-knowledge based data; and responsive to determining that a success count corresponding to a number of factually correct user answers corresponding to the one or more of the plurality of the skills-or-knowledge based authentication questions matches a pre-defined threshold number of matches, authenticating the user for access to the service.

In another example implementation, system is disclosed for user authentication via a chatbot. The system can include a data repository configured for storing user identification information; a user interface configured for displaying authentication questions and receiving user answers from a user; at least one memory for storing data and computer-executable instructions; and at least one processor configured to access the at least one memory and further configured to execute the computer-executable instructions that cause the at least one processor to: receive user information corresponding to a user; resolve the received user information to a unique identifier (UID) for the user; obtain, from one or more data sources, comprehensive data about the user that matches the UID; generate a plurality of authentication questions based on the comprehensive data; output for display on a user device, one or more of the plurality of authentication questions; receive, in a natural language, one or more user answers corresponding to the one or more of the plurality of authentication questions; utilize a large language model (LLM) to evaluate the user answer against a known ground truth based on the comprehensive data; output for display on the user device, an indication corresponding to the evaluation; and authenticate the user for access to a service responsive to determining that a success count corresponding to a number of factually correct user answers corresponding to the one or more of the plurality of authentication questions matches a pre-defined threshold number of matches.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 1I illustrates a user interface with an example question and a user's abbreviated answer.

FIG. 1J illustrates a user interface with an example question and a user's freeform answer in Hebrew.

FIG. 4 depicts a profiling assessment result associated with an authentication attempt, according to an example implementation of the disclosed technology.

FIG. 5A depicts another profiling assessment result related to the user device in association with an authentication attempt, according to an example implementation of the disclosed technology.

FIG. 5B depicts another profiling assessment result related to the user's detected IP address, according to an example implementation of the disclosed technology.

FIG. 9 illustrates an example question pane for querying an individual with a higher education acquired skillset or knowledge, in accordance with certain exemplary implementations of the disclosed technology.

FIG. 10 is a flow diagram of a method, according to an example implementation of the disclosed technology.

FIG. 11 is a flow diagram of a method, according to an example implementation of the disclosed technology.

DETAILED DESCRIPTION

Figure 1A:
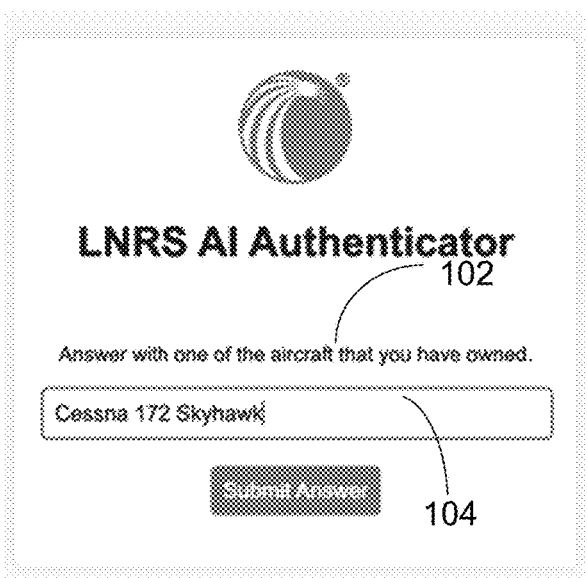
FIG. 1A illustrates a user interface with an example question 102 and a user's freeform answer 104.

The disclosed technology provides a novel authentication technique that enhances security and provides a more reliable and user-friendly authentication mechanism. Exemplary implementations of the disclosed technology can provide certain improvements over conventional authentication methods, which are commonly used to authenticate users and protect against fraud.

The disclosed technology includes a chatbot authentication system and process that may utilize a large language model (LLM) and state of the art generative natural language processing (NLP) to interpret open-ended answers based on known data about the user. The answers provided may be evaluated for accuracy and completeness, and in certain implementations, iterative and/or follow-up questions may be generated and posed to allow the user to provide clarifications or additional details. By virtue of the LLM and NLP, the systems and methods disclosed herein may understand the semantical meaning of the answers provided by the user, which can enable a more accurate, user friendly and secure authentication process.

Certain implementations of the disclosed technology may be used in conjunction with advanced digital proprietary tools such as LexisNexis ThreatMetrix and LexisNexis BehavioSec solutions to detect and prevent fraud attempts. These tools may identify suspicious activities such as pasting, off-paging, use of VPN or remote desktops, or bot/scripted attacks, thus ensuring a secure authentication environment. Certain implementations of the disclosed technology may compare behavioral biometrics patterns to a wide population of users to detect suspicious attempts at answering questions.

The term "user information" is defined herein as any information that can be directly or indirectly tied to a user's identity. User information can include, but is not limited to, personally identifiable information (PII). For example, an e-mail address could be considered as PII since it may be utilized to uniquely identify a specific user. However, a username such as "msmith4149" may not be sufficient to be considered PII, but could be considered as user information.

In accordance with certain exemplary implementations of the disclosed technology, an authentication workflow may include one or more of the following steps to ensure that user's identity is authenticated before they can proceed with accessing or using some service:

(1) a user or customer of an enterprise (such as a bank, e-commerce business, online retailer, etc.) may provide user information to LexisNexis Risk Solutions (LNRS) as a precursor to the authentication process;

(2) LNRS may resolve the received user information to a unique identifier (such as a LexID) for the user;

(3) comprehensive data about the user that matches the LexID may be gathered from LNRS data sources and/or other comprehensive data sources;

(4) digital profiling scripts may gather device and behavioral data responsive to the user loading/accessing an authentication page;

(5) authentication questions may be generated by the system based on a pre-defined configurations;

(6) the user may iteratively get prompted with a number of open-ended questions (based on the pre-defined configurations);

(7) the user may input an answer in natural language with no size, style nor language limitation (as opposed to closed traditional authentication quizzes);

(8) a large language model (LLM) may be utilized to evaluate the users' input against the known ground truth, and in certain implementations, the LLM may output indications or values which corresponding to the evaluation, such as correct, incorrect, or incomplete;

(8a) if the answer is evaluated as factually correct, the user may be prompted with the next question and a success count may be incremented;

(8b) if the answer is evaluated as factually incorrect, the user may be prompted with a next question and the success count may not be incremented;

(8c) if the answer is factually correct but incomplete, the user may be prompted with additional instructions, which indicate missing information (e.g., the color of a car when the user only specifies the model) and the success count may not be incremented until the correct missing information is provided;

(8d) in certain implementations, if the answer is incorrect and incomplete, the user can be prompted with what information is missing;

(9) after all of the questions have been answered, the authentication may either succeed or fail based on the number of correct answers matching a pre-defined threshold or due to the detection of digital risky signals like pasting text, the user going off page, remote access, VPN detected, bot or scripted behavior. Responsive to the evaluation of the answers to the questions, the user may be presented with a success or failure indication. In some implementations, the indication may provide information to the use as to why they passed or failed the authentication.

The disclosed technology offers several advantages over the traditional quiz-based approach. In a first aspect, the LLM may enable a more natural and engaging interaction with the user. In a second aspect, the disclosed technology offers a more thorough and accurate authentication process. For example, the open-ended questions allow for a deeper assessment of the user's knowledge for the questions asked, eliminating the chances of guessing the correct answer, which is a common issue with multiple-choice quizzes. In a third aspect, the disclosed technology may limit or completely avoid exposing facts about the user. In a fourth aspect, the disclosed technology may provide support for many languages. In a fifth aspect, the disclosed technology may be used in conjunction with advanced digital security tools.

Certain implementation of the disclosed technology can provide an extra layer of protection against fraud, which is not offered by traditional authentication methods. This not only ensures a secure authentication process but also instills confidence in users about the security of their personal information. The disclosed technology may enable a more accurate, secure, and user-friendly authentication method, making it a significant advancement in the field of digital security.

Additional details and implementations of the disclosed technology will now be further described with reference to the figures.

FIG. 1A illustrates a user interface with an example question 102 and a user's freeform answer 104.

Figure 1B:
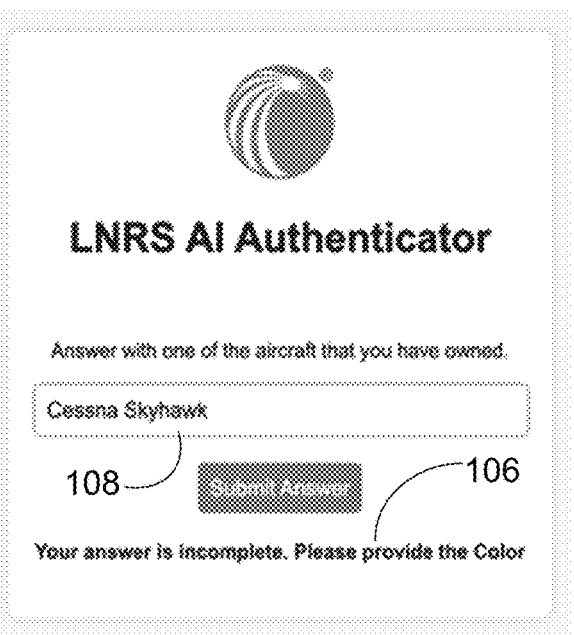
FIG. 1B illustrates a user interface with feedback 106 and an updated user's freeform answer 108.

FIG. 1B illustrates a user interface with feedback 106 and an updated user's freeform answer 108.

Figure 1C:
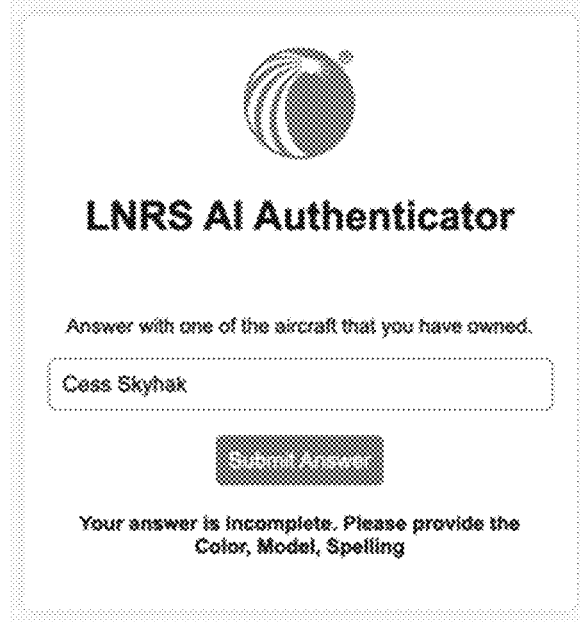
FIG. 1C illustrates a user interface with feedback and an updated user's freeform answer.

FIG. 1C illustrates a user interface with feedback and an updated user's freeform answer.

Figure 1D:
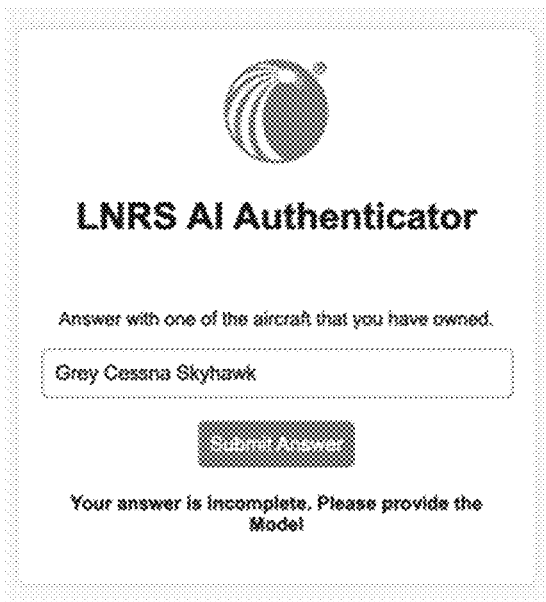
FIG. 1D illustrates a user interface with feedback and an updated user's freeform answer.

FIG. 1D illustrates a user interface with feedback and an updated user's freeform answer.

Figures 1E, 1F:
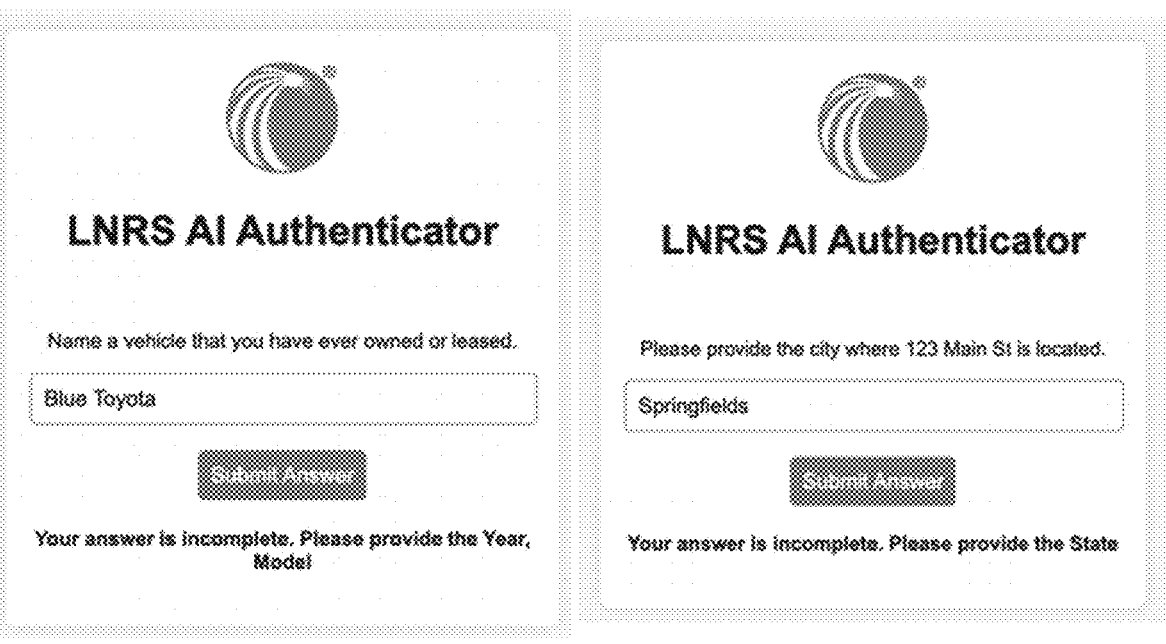
FIG. 1E illustrates a user interface with feedback and a user's freeform answer.
FIG. 1F illustrates a user interface with feedback and a user's freeform answer.

FIG. 1E illustrates a user interface with feedback and a user's freeform answer.

FIG. 1F illustrates a user interface with feedback and a user's freeform answer.

Figures 1G, 1H:
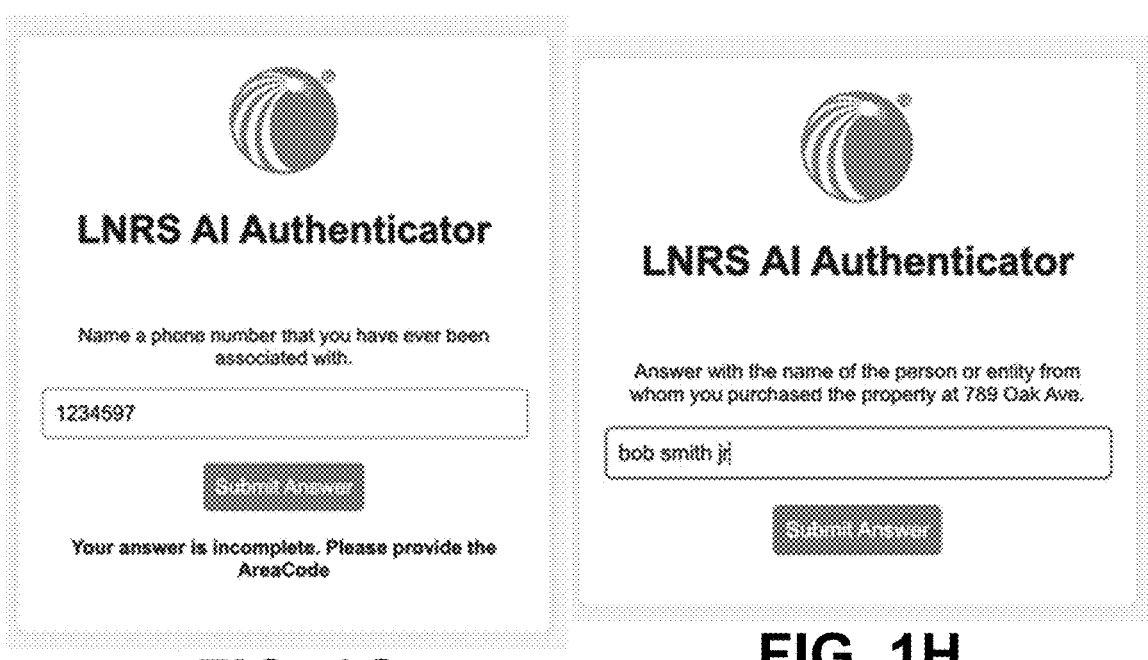
FIG. 1G illustrates a user interface with feedback and a user's freeform answer.
FIG. 1H illustrates a user interface with an example question and a user's freeform answer.

FIG. 1G illustrates a user interface with feedback and a user's freeform answer.

FIG. 1H illustrates a user interface with an example question and a user's freeform answer.

FIG. 1I illustrates a user interface with an example question and a user's abbreviated answer.

FIG. 1J illustrates a user interface with an example question and a user's freeform answer in Hebrew.

Figure 1K:
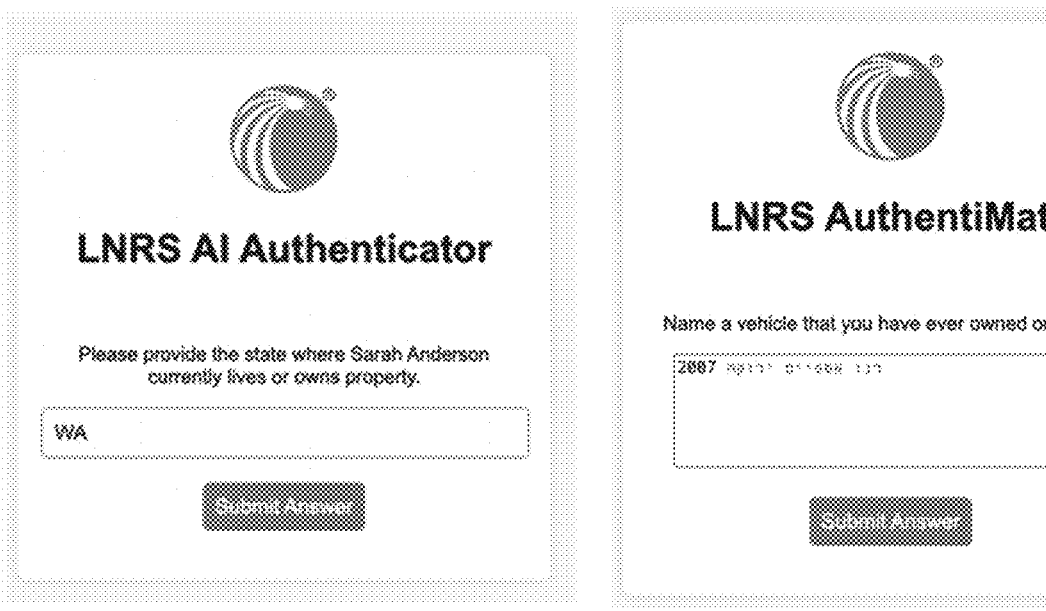
FIG. 1K illustrates a user interface with an example question and a user's freeform answer in French.
Figure 1K:
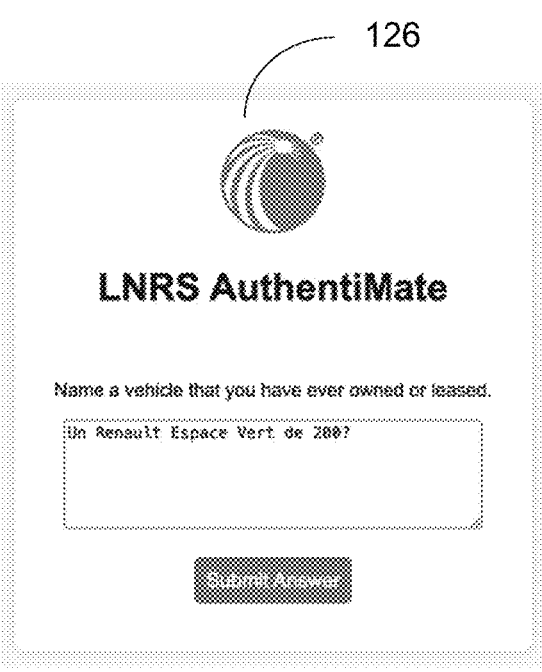

FIG. 1K illustrates a user interface with an example question and a user's freeform answer in French.

Figure 1L:
FIG. 1L illustrates a user interface with an indication of successful authentication.

FIG. 1L illustrates a user interface with an indication of successful authentication.

Figure 1M:
FIG. 1M illustrates a user interface with an indication of failed authentication.
Figure 1N:
FIG. 1N illustrates a user interface with an indication of failed authentication due to detection of a pasted answer, remote access, etc.

FIG. 1M illustrates a user interface with an indication of failed authentication.

FIG. 1M illustrates a user interface with an indication of failed authentication due to detection of a pasted answer, remote access, etc.

Figure 2:
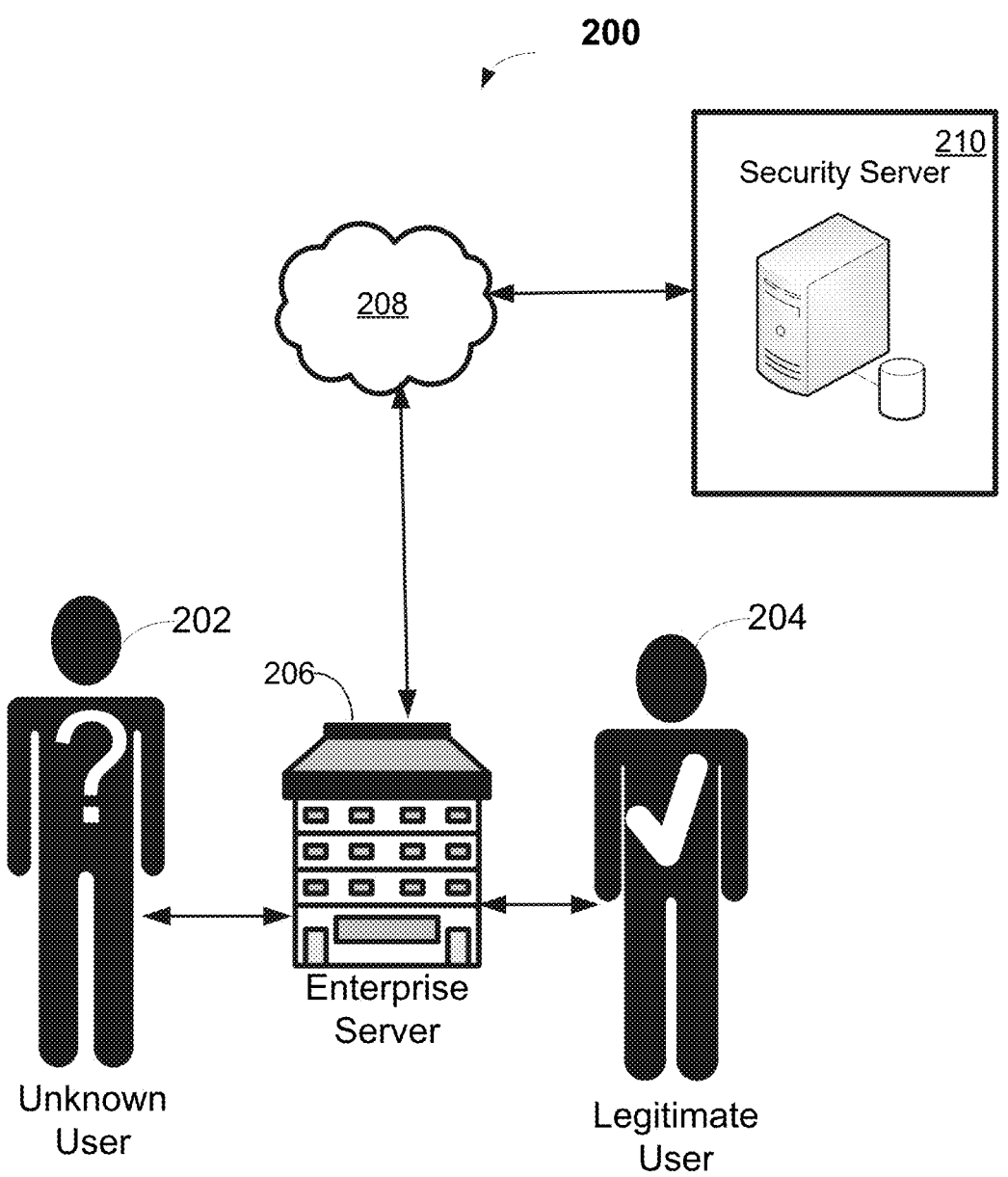
FIG. 2 is a block diagram of an authentication system, according to an example implementation of the disclosed technology.

FIG. 2 is a high-level block diagram of an authentication system 200, according to an example implementation of the disclosed technology. The system 200 may be configured to distinguish between an unknown user 202 and a legitimate user 204 who requests access to an online service of the enterprise server 206. The enterprise server 206, for example, may be associated with an enterprise such as a business, governmental agency, online retailer, etc. The system 200 may further include (or be in communication via a network 208 with) a security server 210 that may work in tandem with the enterprise server 206, for example, to generate security questions and interpret corresponding answers via a chatbot that may be verified to authenticate a legitimate user 204 for access to the online service of the enterprise server 206, as will be further discussed below.

Figure 3:
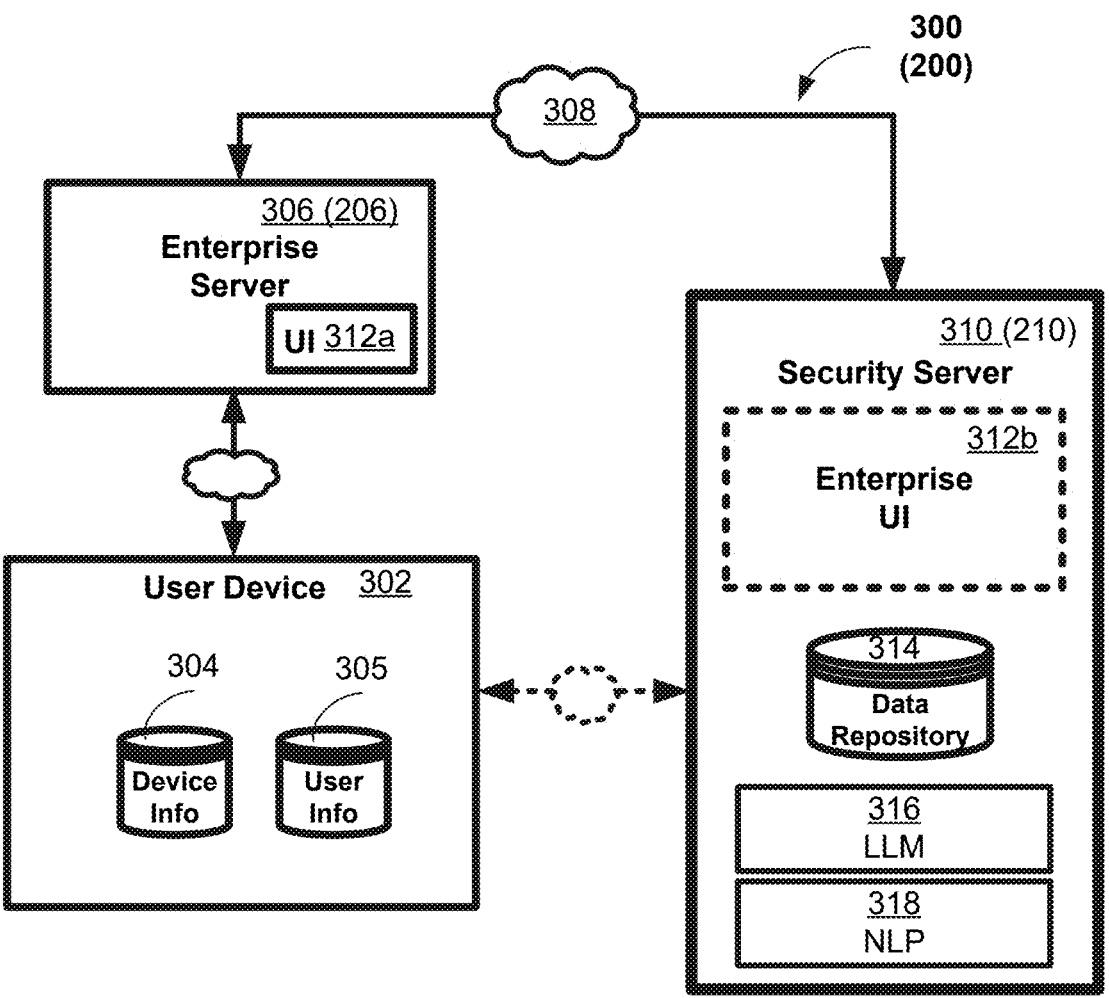
FIG. 3 is another block diagram of an authentication system, according to an example implementation of the disclosed technology.

FIG. 3 is a block diagram of an authentication system 300, according to an example implementation of the disclosed technology, which may correspond to the high-level authentication system 200 discussed above with reference to FIG. 2. In accordance with certain exemplary implementations of the disclosed technology, a user (legitimate or otherwise) may utilize a user device 302 (such as a computer, tablet, mobile phone, smartphone, etc.) to communicate with an enterprise server 306 for enrollment and/or authentication for access to an online service. In certain exemplary implementations, certain device information 304 and/or user information 305 stored on the user device 302 may be utilized in conjunction with the disclosed technology as an additional layer of security, for example, to confirm the use of a recognized device for authentication by an associated user. Examples of device information 304 include a unique device identifier (UDID), an identifier for advertisers (IDFA), an internet protocol (IP) address, a MAC address, and the like.

In certain exemplary implementations, the enterprise server 306 may be in communication with a security server 310 via a network 308 such as the Internet, wide area network, local area network, etc. The security server 310 may include a data repository 314 for generating, storing, and/or retrieving authentication questions, answers, etc. In certain exemplary implementations, the security server 310 may include one or more large language model(s) (LLM) 316 and a natural language processor (NLP) 318 that may be utilized to interact with the user, generate questions, interpret answers, etc.

In accordance with certain exemplary implementations of the disclosed technology, the enterprise server 306 may provide a user interface (UI) 312*a* for communication with the user device 302. In certain exemplary implementations, the control, formatting, presentation, display, capture of user responses, etc., may be coordinated by the enterprise server 306 via the UI 312*a*, in communication with the security server 310. In an optional example implementation, the security server 310 may "host" an enterprise UI 312*b*, for example, so that user enrollment and/or authentication may be processed by the security server 310. In certain exemplary implementations, the user device 312 may connect (via the network 308) with security server 310. In certain exemplary implementations, enterprise server 306 may redirect the user device 302 to the security server 310 to perform enrollment and/or authentication.

FIG. 4 depicts an example profiling assessment result associated with an authentication attempt, according to an example implementation of the disclosed technology. In certain implementations, various behaviometric signals and/or data may be monitored and analyzed to determine the likelihood of a bot or a fraudster impersonating a user. In certain implementations, scoring may be utilized to help identify potential instances of fraud. In certain implementations, the determined behaviometric profile may indicate a certain type of fraud, such as possible social engineering. In certain implementations, the profiling assessment result may be utilized in conjunction with the other authentication processes disclosed herein to provide enhanced authentication security.

FIG. 5A depicts another example profiling assessment result related to the user device in association with an authentication attempt, according to an example implementation of the disclosed technology. In certain implementations, a user device ID may be checked against historical usage to determine whether a new device is being utilized to attempt authentication. In certain implementations, if an unrecognized user device is detected, additional authentication steps may be required.

FIG. 5B depicts another example profiling assessment result related to the user's detected IP address, according to an example implementation of the disclosed technology. In certain implementations, the detected IP address may be checked against historical usage to determine whether an unrecognized or suspicious communication channel is being utilized to attempt authentication. In certain implementations, if an unrecognized or suspicious communication is being utilized is detected, additional authentication steps may be required.

Additional authentication assessments, for example, as discussed above with reference to FIGS. 4, 5A, and 5B, may be utilized in conjunction with the assessment of a user's natural language answer(s) by the LLM, as disclosed herein, to provide enhanced authentication security. The following U.S. patents and U.S. patent application Publications are incorporated herein by reference, as if presented in full, and may be utilized to describe various systems and/or processes that may be utilized herein for profiling assessments, for example, to provide enhanced authentication security: U.S. Pat. Nos. 11,860,985; 11,329,975; 10,505,932; 10,142,369; 10,116,667; 10,764,297; 10,841,324; 9,444,835; and U.S. Patent Application Publication Nos. 20240037541; 20240259394; 20240256120; 20240297898.

Figure 6:
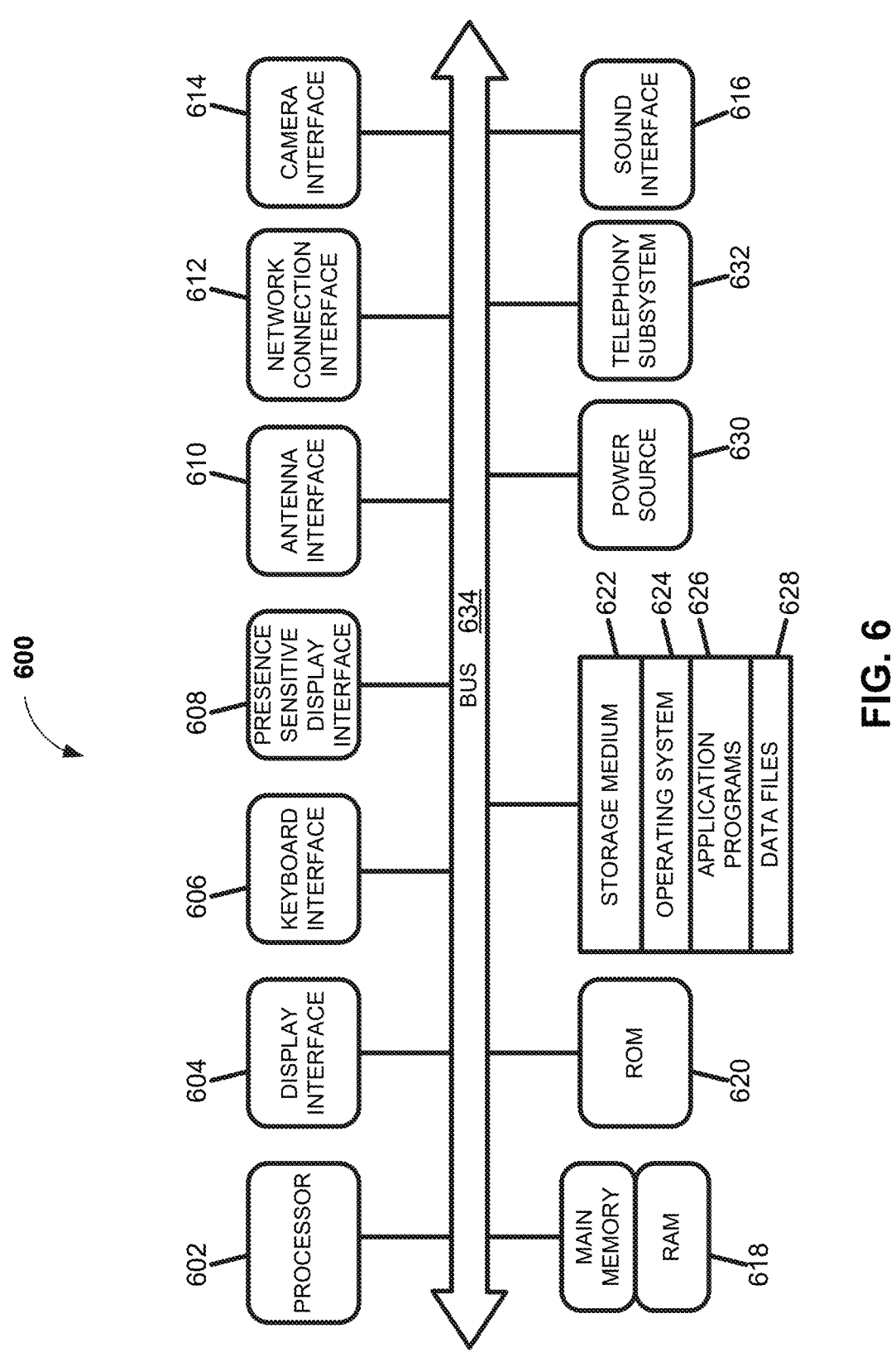
FIG. 6 is a block diagram depiction of a computing device, in accordance with certain exemplary implementations of the disclosed technology.

FIG. 6 is a block diagram of an illustrative computing device 600 that may be utilized for the identity enrollment and/or an authentication process, according to an example implementation of the disclosed technology. The computing device 600 may handle various aspects of the process, including communicating with the various entities and/or external systems involved in the authentication process. For example, the computing device 600 may communicate via one or more cloud, Internet, or other network channels to send and/or receive information. For example, the computing device 600 may receive identity information related to the user, and independent information may be received in response to querying one or more public or private databases.

The computing device 600 of FIG. 6 includes a central processing unit (CPU) 602, where computer instructions are processed; a display interface 604 that acts as a communication interface and provides functions for rendering video, graphics, images, and texts on the display. In certain example implementations of the disclosed technology, the display interface 604 may be directly connected to a local display, such as a touch-screen display associated with a mobile computing device. In another example implementation, the display interface 604 may be configured for providing data, images, and other information for an external/remote display that is not necessarily physically connected to the computing device. For example, a desktop monitor may be utilized for mirroring graphics and other information that is presented on the computing device 600. In certain example implementations, the display interface 604 may wirelessly communicate, for example, via a Wi-Fi channel or other network connection interface 612 to an external/remote display.

In an example implementation, the network connection interface 412 may be configured as a communication interface, for example, to provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high-definition multimedia (HDMI) port, a video port, an audio port, a Bluetooth port, a near-field communication (NFC) port, another like communication interface, or any combination thereof.

The computing device 600 may include a keyboard interface 606 that provides a communication interface to a keyboard. In one example implementation, the computing device 600 may include a presence sensor interface 608 for interfacing with a pointing device and/or touch screen. According to certain example implementations of the disclosed technology, the presence sensor interface 608 may provide a communication interface to various devices such as a pointing device, a touch screen, a depth camera, etc. which may or may not be associated with a display.

The computing device 600 may be configured to use an input device via one or more of the input/output interfaces (for example, the keyboard interface 606, the display interface 604, the presence sensor interface 608, the network connection interface 612, the camera interface 614, sound interface 616, etc.) to allow a user to capture information into the computing device 600. The input device may include a mouse, a trackball, a directional pad, a trackpad, a touch-verified trackpad, a presence-sensitive trackpad, a presence-sensitive display, a scroll wheel, a digital camera, a digital video camera, a web camera, a microphone, a sensor such as an accelerometer or gyroscope, a smartcard, iris reader, fingerprint reader, voiceprint reader, and the like. Additionally, the input device may be integrated with the computing device 600 or may be a separate device.

Example implementations of the computing device 600 may include an antenna interface 610 that provides a communication interface to an antenna; a network connection interface 612 that provides a communication interface to a network. In certain implementations, a camera interface 614 is provided for capturing digital images, for example, from a camera. In certain implementations, a sound interface 616 is provided as a communication interface for converting sound into electrical signals using a microphone and for converting electrical signals into sound using a speaker. According to example implementations, a random-access memory (RAM) 618 is provided, where computer instructions and data may be stored in a volatile memory device for processing by the CPU 602.

According to an example implementation, the computing device 600 includes a read-only memory (ROM) 620 where invariant low-level system code or data for basic system functions such as basic input and output (I/O), startup, or reception of keystrokes from a keyboard are stored in a non-volatile memory device. According to an example implementation, the computing device 600 includes a storage medium 622 or another suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 624, application programs 626 (including, for example, a web browser application, an invoice extraction module, etc.) and data files 628 are stored. According to an example implementation, the computing device 600 includes a power source 630 that provides an appropriate alternating current (AC) or direct current (DC) to power components. According to an example implementation, the computing device 600 may include a telephony subsystem 632 that allows the device 600 to transmit and receive sound over a telephone network. The constituent devices and the CPU 602 communicate with each other over a bus 634.

In accordance with an example implementation, the CPU 602 has an appropriate structure to be a computer processor. In one arrangement, the computer CPU 602 may include more than one processing unit. The RAM 618 interfaces with the computer bus 634 to provide quick RAM storage to the CPU 602 during the execution of software programs such as the operating system application programs, and device drivers. More specifically, the CPU 602 loads computer-executable process steps from the storage medium 622 or other media into a field of the RAM 618 in order to execute software programs. Data may be stored in RAM 618, where the data may be accessed by the computer CPU 602 during execution. In one example configuration, the device 600 includes at least 128 MB of RAM, and 256 MB of flash memory.

The storage medium 622 itself may include a number of physical drive units, such as a redundant array of independent disks (RAID), a floppy disk drive, a flash memory, a USB flash drive, an external hard disk drive, a thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer-readable storage media allow the device 600 to access computer-executable process steps, application programs, and the like that are stored on removable and non-removable memory media, to off-load data from the device 600 or to upload data onto the device 600. A computer program product, such as one utilizing a communication system may be tangibly embodied in storage medium 622, which may comprise a machine-readable storage medium.

Figure 7:
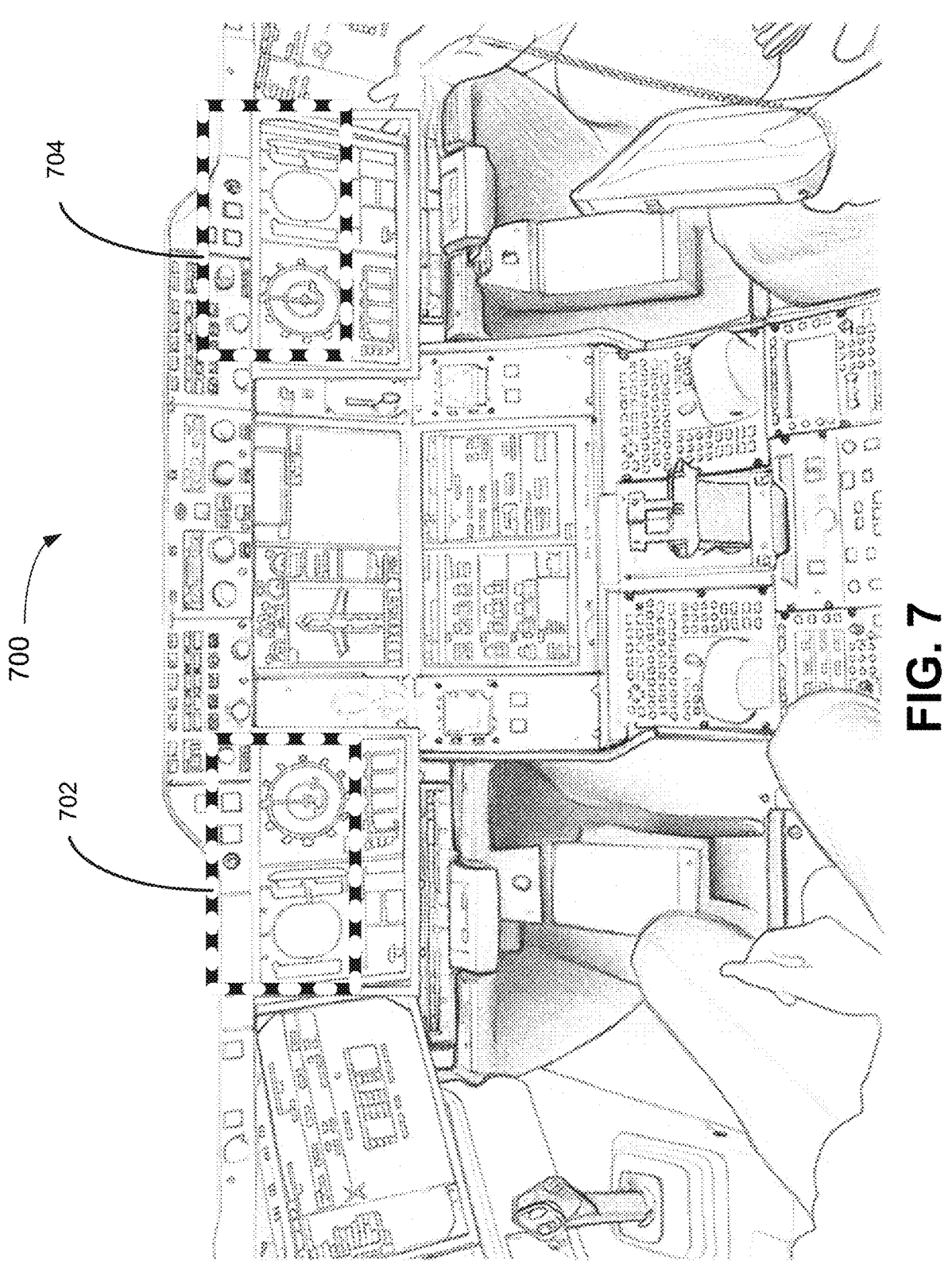
FIG. 7 illustrates an example photo of an airplane cockpit with portions of the controls identified with corresponding questions to test skills-based knowledge of an individual who has a commercial pilot's license, according to an example implementation of the disclosed technology.

FIG. 7 illustrates an example photo of an airplane cockpit 700 with portions 702, 704 of the controls or displays identified for accompanying questions to test skills-based knowledge of an individual, for example, who has a commercial pilot's license, according to an example implementation of the disclosed technology.

Example questions that may be generated and may accompany the photo shown in FIG. 7 (or similar photo) may include:

What are the highlighted displays known as?

Name 4 telemetries available on these displays.

Figure 8:
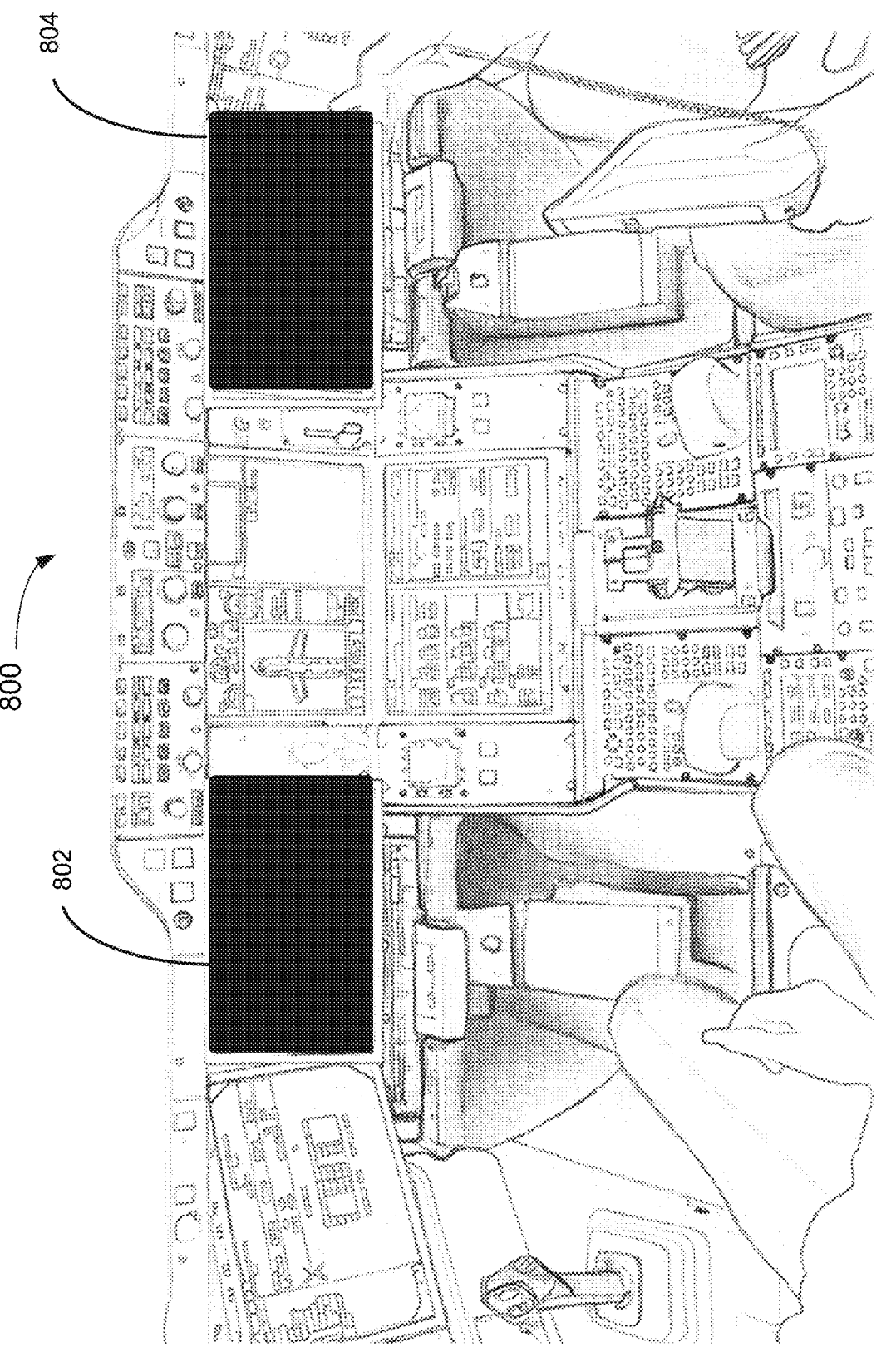
FIG. 8 illustrates an example photo of an airplane cockpit with portions of the controls blacked-out with corresponding questions to test skills-based knowledge of an individual who has a commercial pilot's license, according to an example implementation of the disclosed technology.

FIG. 8 illustrates an example photo of an airplane cockpit 800 with portions 802 804 of the controls or displays grayed-out and identified for accompanying corresponding questions to test skills-based knowledge of an individual who, for example, has a commercial pilot's license, according to an example implementation of the disclosed technology.

Example questions that may by generated and may accompany the photo shown in FIG. 9 (or similar photo) may include:

What are the grayed out displays called?

Name 4 telemetries that are typically available on the grayed out displays.

Certain implementations of the disclosed technology may perform analysis of the provided answers, for example, by utilizing a large language model (LLM) to evaluate the user answer against a known ground truth. In certain implementations, a LLM may be utilized to generate the questions based on the particular skill or knowledge of the individual.

In accordance with certain exemplary implementations of the disclosed technology, questions may be generated and posed to the individual based on higher education topics an individual may be known to possess.

FIG. 9 illustrates an example question pane 900 for querying an individual with a higher education acquired skill set such as Ph.D. in a quantum computing field. In accordance with certain exemplary implementations of the disclosed technology, the question pane 900 may pose an open-ended question 902 to the user, such as "Explain what your Ph.D. was about." Illustrated within the dashed portion 904 of FIG. 9 is an example (test mode) answer that is not displayed in the question pane 900 but is included to illustrate the type of specific (Ph. D. thesis) subject-related data that may be obtained from one or more comprehensive data sources related to the user's skill or knowledge. The user may respond to the open-ended question 902 by typing the natural language user answer 906 in the appropriate pane, and the user may press the "submit answer" button 910 to send the user answer to the system such as the Enterprise Server 306 (206) and/or the Security Server 310 (210) as discussed above with reference to FIGS. 2 and 3). The Security Server, for example, may receive the user answer corresponding to the open-ended and/or skills-based and/or knowledge-based questions and may utilize a large language model (LLM) to evaluate the one or more user answer against a known ground truth based on comprehensive skills-or-knowledge based data (such as illustrated within the dashed portion 904). As illustrated in the feedback response 912, and in this example, the pre-defined configuration may require a level of detail that the initial user answer did not satisfy. In this case, the feedback response 912 may indicate that the answer is incomplete, and in certain implementations, may also provide feedback for what information is missing in the user answer 906. The user may then supplement their initial answer 906 with the missing information.

In certain implementations, the pre-defined configuration may specify one or more of: (a) a number of open-ended authentication questions to generate; (b) a threshold number of matches required for authentication; (c) a complexity level of the open-ended authentication questions to generate; and/or (d) a level of detail required in the one or more user answers. In certain implementations, the required complexity level can include a number of contextual variables related to the user and/or their field of expertise. Thus, in certain implementations, when the pre-defined configuration requires more than one correct answer for authentication, the user may be presented with additional open-ended and/or skills-or-knowledge based questions. When a question is correctly answered, a success count may be advanced. Responsive to determining that a success count corresponding to a number of factually correct user answers corresponding to the one or more of the plurality of the skills-or-knowledge based authentication questions matches a predefined threshold number of matches, the disclosed technology may authenticate the user, for example, for access to a service.

In certain implementations, questions may be generated about a person's known profession, e.g. software engineer, lawyer, etc. In certain implementations, the questions may be text-based. In other implementations, the questions may include an accompanying video or image as shown in FIGS. 7 and 8.

In certain implementations, the skills-based questions may be asked in conjunction with knowledge-based questions for a higher degree of accuracy in verification. Although some of these skills-based questions may be researchable, certain form monitoring capabilities, such as time limits, monitoring of other open windows, etc., may be utilized to protect against accepting answers that are researched in real time.

FIG. 10 is a flow diagram of a method 1000 for user authentication for access to a service using a chatbot, according to an example implementation of the disclosed technology. In certain implementations, the method 1000 can cover an enrollment process for a user and an associated authentication process for the user to access and/or utilize a service. The method 1000 begins in block 1002 and includes receiving user information corresponding to a user. In block 1004, the method 1000 includes resolving the received user information to a unique identifier (UID) for the user. In block 1006, the method 1000 includes obtaining, from one or more data sources, comprehensive data about the user that matches the UID. In block 1008, the method 1000 includes generating a plurality of open-ended authentication questions based on the comprehensive data. In block 1010, method 1000 includes outputting, for display on a user device associated with the user, one or more of the plurality of open-ended authentication questions. In block 1012, the method 1000 includes receiving, in a natural language, one or more user answers corresponding to the one or more of the plurality of open-ended authentication questions. In block 1014, the method 1000 includes utilizing a large language model (LLM) to evaluate the one or more user answers against a known ground truth based on the comprehensive data. In block 1016, the method 1000 includes, responsive to determining that a success count corresponding to a number of factually correct user answers corresponding to the one or more of the plurality of open-ended authentication questions matches a pre-defined threshold number of matches, authenticating the user for access to the service.

In certain implementations, the method can further include gathering user device data and behavioral data responsive to the user accessing an authentication page. In certain implementations, the method can include generating a digital profile associated with the user.

In certain implementations, generating the plurality of open-ended authentication questions may be based on a pre-defined configuration. For example, the pre-defined configuration can include one of more of the following: (a) a number of open-ended authentication questions to generate; (b) a threshold number of matches required for authentication, wherein the threshold number is less than or equal to the number of open-ended authentication questions; (c) a complexity level of the open-ended authentication questions to generate and/or (d) a level of detail required in the one or more user answers. In certain implementations, the complexity level can include a number of contextual variables related to the user. As discussed above with reference to FIG. 9, the level of detail required in the one or more user answers, for example, can include one of more of observations, experiments, contributions, specific details, specific knowledge, etc.

In certain implementations, a LLM may be utilized for generating the plurality of open-ended authentication questions.

In certain implementations, if a user answer is evaluated as factually correct, the method can include outputting for display on the user device, a next question and incrementing the success count. In certain implementations, if a user answer is evaluated as factually incorrect, the method can include outputting for display on the user device, a next question without incrementing the success count. In certain implementations, if a user answer is factually correct but incomplete, the method can include outputting for display on the user device, additional instructions to indicate missing information without incrementing the success count. In certain implementations, if a user answer is incorrect and incomplete, the method can include outputting for display on the user device, additional instructions to indicate missing information without incrementing the success count.

In certain implementations, the method can include outputting, for display on the user device, an indication corresponding to the evaluation, such as correct, incorrect, or incomplete.

In accordance with certain exemplary implementations of the disclosed technology, the one or more data sources can include one or more of: court records, birth certificate records, census bureau records, county records, property records, real estate records, court records, business records, school records, education records, webpages, professional license records, historical records, social media records, marketing records, publications, private records, media records, background records, proprietary data, and derived data records.

In certain exemplary implementations, a list of multiple-choice answers may be presented to the user for selection. In certain implementations, the multiple-choice answers may be associated with indices or pointers so that comparison (between the answers selected during enrollment and authentication) only needs to match indices.

In addition to the knowledge-based authentication improvements, the disclosed technology can be further expanded into asking questions about a certain skillset that an individual may possess. For example, the system can generate questions based on professional skills, specific knowledge, and/or licenses that an individual may have been accredited with, for example, a commercial pilot's license, a Ph.D. in a certain field, etc., as discussed above with respect to FIGS. 7, 8, and/or 9.

FIG. 11 is a flow diagram of another method 1100, according to an example implementation of the disclosed technology, for user authentication for access to a service. The method 1100 can cover an enrollment process for a user and an associated authentication process for the user. The method 1100 begins in block 1102 and includes receiving user information corresponding to a user. In some implementations, the user information may be obtained directly from the user via a user device. In certain implementations, some or all of the user information may be retrieved from a data repository, for example, based on a username and/or password and/or successful two-factor authorization, etc., that the user device is known to be associated with the user. In block 1104, the method 1100 includes resolving the received user information to a unique identifier (UID) for the user. In block 1106, the method 1100 includes obtaining, from one or more data sources, comprehensive skills-orknowledge based data about the user that matches the UID. In block 1108, the method 1100 includes generating a plurality of skills-or-knowledge based authentication questions based on the comprehensive skills-or-knowledge based data. In block 1110, the method 1100 includes outputting, for display on a user device, one or more of the plurality of the skills-or-knowledge based authentication questions. In block 1112, the method 1100 includes receiving, in a natural language, one or more user answers corresponding to the one or more of the plurality of the skills-or-knowledge based authentication questions. In block 1114, the method 1100 includes utilizing a large language model (LLM) to evaluate the one or more user answer against a known ground truth based on the comprehensive skills-or-knowledge based data. In block 1116, the method 1100 includes, responsive to determining that a success count corresponding to a number of factually correct user answers corresponding to the one or more of the plurality of the skills-or-knowledge based authentication questions matches a pre-defined threshold number of matches, authenticating the user for access to the service.

Certain implementations of the disclosed technology can include outputting an indication corresponding to the evaluation (such as the indication 912 as discussed above with reference to FIG. 9.

Certain implementations of the disclosed technology include can include gathering user device and/or behavioral data responsive to the user accessing an authentication page. Certain implementations of the disclosed technology include generating a digital profile associated with the user.

In certain implementations, generating the plurality of skills-or-knowledge based authentication questions may be based on a pre-defined configuration. For example, the pre-defined configuration can include one of more of the following: (a) a number of open-ended authentication questions to generate; (b) a threshold number of matches required for authentication, wherein the threshold number is less than or equal to the number of open-ended authentication questions; (c) a complexity level of the open-ended authentication questions to generate and/or (d) a level of detail required in the one or more user answers. In certain implementations, the complexity level can include a number of contextual variables related to the user. As discussed above with reference to FIG. 9, the level of detail required in the one or more user answers, for example, can include one of more of observations, experiments, contributions, specific details, specific knowledge, etc.

In certain implementations, the outputting, for display on a user device, the one or of the plurality of skills-or-knowledge based authentication questions can include an accompanying photograph or video of an apparatus associated with the comprehensive skills-or-knowledge based data about the user that matches the UID.

In certain implementations, one or more of the skills-or-knowledge based authentication questions can include one or more open-ended questions.

In certain implementations, a LLM may be utilized for generating the one or more of the skills-or-knowledge based authentication questions.

In certain implementations, the method can include outputting, for display on the user device, an indication corresponding to the evaluation, such as correct, incorrect, or incomplete.

In certain implementations, if a user answer is evaluated as factually correct, the method can include outputting for display on the user device, a next question and incrementing the success count. In certain implementations, if a user answer is evaluated as factually incorrect, the method can include outputting for display on the user device, a next question without incrementing the success count. In certain implementations, if a user answer is factually correct but incomplete, the method can include outputting for display on the user device, additional instructions to indicate missing information without incrementing the success count. In certain implementations, if a user answer is incorrect and incomplete, the method can include outputting for display on the user device, additional instructions to indicate missing information without incrementing the success count.

In certain implementations, and responsive to determining that the success count matches a pre-defined threshold, the method can include authenticating the user for access to the service.

Certain implementations of the disclosed technology can include gathering user device and/or behavioral data responsive to the user accessing an authentication page to generate a digital profile associated with the user. In certain implementations, the digital profile may be utilized as an additional layer of security for authentication.

In accordance with certain exemplary implementations of the disclosed technology, the authentication questions may be presented during the authentication stage based on how a user answered one or more questions during an enrollment stage. Accordingly, certain weighting and/or logic may be applied for determining which questions to display for the user to answer during the authentication stage. For example, user preferred answer(s) to the authentication question(s) during enrollment may be tabulated over a population of users to rank answer choices from most prevalent (or most commonly chosen) to most unique (or least commonly chosen) for that population. If a user answered a first authentication question during the enrollment stage that ranks high in prevalence among their associated population, and if the user answered a second authentication question during the enrollment that ranks lower in prevalence (i.e., more unique among the associated population), then the authentication topic presented during authentication may be automatically selected for presentation (from among the user's previously answered authentication questions) based on the prevalence/uniqueness ranking or weighting so that authentication question topics corresponding to most unique answers may be automatically selected for presentation to the user. In certain exemplary implementations, the above-referenced population could include all users or subgroups of users. In certain exemplary implementations, subgroups of users may be divided by geographical region, etc. In certain exemplary implementations, one or more questions may be randomly selected.

A legitimate user, as defined herein, is a person who represents their true identity, for example, in the process of identity verification (as opposed to a fraudster who may misrepresent their identity as someone else). In certain exemplary implementations, the legitimacy of a user may be determined based on answers to questions. Authentication of the user may be provided based on a correct response by the user according to the presented question.

In an example implementation, the received set of identity information may also include information that may directly or indirectly identify certain characteristics about the communication channel and/or user device 302 used by the user (202 204), such as a phone number, IP address, MAC address, location, signal-to-noise, unique browser configuration, operating system, installed fonts, installed plug-ins, etc. In an example implementation, the characteristics of the communication channel 308 or device 302 may be utilized in conjunction with the selection(s) received to determine one or more of:

- if the received phone number associated with the communication channel or device 302 differs or is altered in some way from the originating device phone number (i.e. spoofed);
- if the user's device 302 is located where it would be expected to be (i.e., within the home city or state of the user);
- if the user's device 302 is located in a region associated with a high crime rate;
- if the user's device 302 is located in a foreign country;
- details about the user's device 302 (i.e., device fingerprinting) that may be corroborated by independent information.

Depending on the analysis of the response, or other factors where risk is determined to be higher than acceptable, the user may be presented with other options or instructions to further validate the user's identity. For example, certain embodiments may include online or offline capture of identification documents (such as a driver's license, social security card, credit card, bank card, utility bill, tax return, etc.) for further identity verification.

The identity authentication process disclosed herein may utilize all or part of the previously gathered, compared, analyzed, and/or scored information to determine a fraud risk score. In certain example implementations, the fraud risk score may provide additional confidence for accepting or rejecting the authentication.

If the received response from the user is determined to correspond to the correct answer, certain implementations can further include initiating biometric capture of the user. For example, in certain example implementations, biometric capture may be used to associate the user identity information with some type of physically verifiable (biometric) information, such as a fingerprint, a voiceprint, an iris image, a facial image, etc.

If the user does not provide the correct answer, certain implementations may prevent or block additional authentication steps and an indication of failure may be output. For example, in situations where the risk is determined to be higher than acceptable, the user may be presented with other options or instructions to validate his or her identity.

In some implementations, the initial and/or additional authentication process steps may be controlled based on company or governmental oversight policy. For example, in order to conform to certain state laws, an authentication challenge method to verify identity may need to be based on commercially reasonable tools. In other situations, and depending on the business policy, certain transactions may require a specific type of authentication. Certain banks, for example, may require authentication for balance transfers over $10,000.

In some implementations, if a user provides an incorrect answer, the system may generate and present additional question panes to the user. Provided the user correctly answers a predetermined number or percentage of the question panes within a limited or allotted time, the system may authenticate the user.

One objective of the disclosed technology is to raise the strength and security of the authentication process by forcing a user (who may or may not be legitimate) to provide an proof of their skill or knowledge via their answers to open ended questions. Certain implementations of the disclosed technology may provide additional security by also requiring a "possession" factor. In certain implementations, the pane(s) with answers for selection may be sent to a user using various so-called "out-of-band" communication channels or combinations of channels such as by messaging, URL access, etc. For example, in one implementation, the question pane may be sent or presented to a user using one communication channel or device (such as via a browser on a desktop computer) while user answers may be submitted using another communication channel or device (such as via a text message on a smartphone). Such multi-channel/device communications may provide a "possession" factor for security in an authentication process.

In certain example implementations, the techniques as disclosed herein may provide enhanced confidence that an individual is who they claim to be based on their ability to provide correct answers to authentication questions. Certain example implementations may help minimize the probability of a fraudster acquiring the necessary information to correctly answer the question.

Certain implementations can further impose a time limit on receiving the answer response. In some implementations, the time limit is less than one minute.

In some implementations, and responsive to an incorrect or incomplete answer, an indication of authentication failure or additional feedback may be sent to the user's computing device for display.

Certain example implementations of the disclosed technology may enable effective determination and management of identity fraud risk. Certain implementations may be utilized to detect suspicious and/or fraudulent activities associated with the process of establishing a new account and/or requesting goods and services. For example, a user seeking to establish a new account (such as a credit account, banking account, utility account, etc.) or apply for a benefit or service (such as a tax refund, etc.) may provide a basic set of user information, which may include personal identity information (PII) such as a name, address, telephone number, social security number, etc. In certain implementations, the provided user information can include information such as a username, for example, that may not technically be considered PII, but that could be used by certain systems to identify a user. In an example implementation, all or part of the set of user information may be utilized to query one or more public and/or private databases to obtain independent information. In certain example implementations, the independent information may be processed to determine/detect/score indicators of risk. According to an example implementation of the disclosed technology, account applicants who fail the authentication may not be allowed to proceed.

Certain example embodiments of the disclosed technology may allow for offline, manual, and/or custom validation of a user's identity when the user fails the authentication. For example, certain legitimate users may fail due to various factors. In these situations, it may be possible to obtain the appropriate authentication by offline, manual, and/or custom validation. For example, in one implementation, a user who fails authentication may be asked to provide additional proof of their identity. In another example implementation, a user who fails one of the stages may be asked to appear in person at a vendor location for further questioning and/or documentation.

Certain embodiments utilize non-fair credit reporting act (non-FCRA) implementations, for example, so if a user fails one or more stages, such information will not be utilized for denying employment, credit, etc. In such situations, a vendor for which the user is seeking authentication may provide other offline, manual, and/or custom validation options. However, if the user passes the open-ended question authentication, then an additional process may be utilized to initiate the authentication, such as biometric authentication. Furthermore, if the user passes the open-ended question authentication process, certain implementations of the disclosed technology may provide an efficient means for identity authentication.

According to example implementations, certain technical effects can be provided, such as creating certain systems and methods that may reduce fraud losses and improve operational efficiency. Example implementations of the disclosed technology can provide further technical effects by providing systems and methods for detecting identity fraud. Certain implementations of the disclosed technology may further provide the technical effects of authenticating a user's identity via natural language processing.

In certain example implementations of the disclosed technology, the identity authentication process may be implemented using any number of hardware and/or software applications that are executed to facilitate any of the operations. In example implementations, one or more I/O interfaces may facilitate communication between the identity authentication system and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the identity authentication system. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate the connection of the identity authentication system inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network any wired network, any wireless network, etc., for communication with external devices and/or systems.

As desired, implementations of the disclosed technology may include an identity authentication system with more or less of the components illustrated in FIG. 2, 3, or 6.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements, or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description herein uses examples to disclose certain implementations that enable any person skilled in the art to practice the disclosed technology, including making and using any devices or systems and performing any incorporated methods. The patentable scope of the disclosed technology is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer-implemented method for user authentication for access to a service using a chatbot, the method comprising:
    receiving user information corresponding to a user;
    resolving the received user information to a unique identifier (UID) for the user;

obtaining, from one or more data sources, comprehensive data about the user that matches the UID;
    generating a plurality of open-ended authentication questions based on the comprehensive data;
    outputting for display on a user device associated with the user, one or more of the plurality of open-ended authentication questions;
    receiving, in a natural language, one or more user answers corresponding to the one or more of the plurality of open-ended authentication questions;
    utilizing a large language model (LLM) to evaluate the one or more user answers against a known ground truth based on the comprehensive data; and
    responsive to determining that a success count corresponding to a number of factually correct user answers corresponding to the one or more of the plurality of open-ended authentication questions matches a predefined threshold number of matches, authenticating the user for access to the service.

2. The computer-implemented method of claim 1, further comprising:
    gathering user device data and behavioral data responsive to the user accessing an authentication page; and
    generating a digital profile associated with the user.

3. The computer-implemented method of claim 1, wherein generating the plurality of open-ended authentication questions is further based on a pre-defined configuration.

4. The computer-implemented method of claim 3, wherein the pre-defined configuration comprises one or more of:
    a number of open-ended authentication questions to generate;
    a threshold number of matches required for authentication, wherein the threshold number is less than or equal to the number of open-ended authentication questions;
    a complexity level of the open-ended authentication questions to generate, wherein in the complexity level comprises a number of contextual variables related to the user; and
    a level of detail required in the one or more user answers.

5. The computer-implemented method of claim 1, wherein a LLM is utilized for generating the plurality of open-ended authentication questions.

6. The computer-implemented method of claim 1, wherein:
    if a user answer is evaluated as factually correct, outputting for display on the user device, a next question and incrementing the success count;
    if a user answer is evaluated as factually incorrect, outputting for display on the user device, a next question without incrementing the success count;
    if a user answer is factually correct but incomplete, outputting for display on the user device, additional instructions to indicate missing information without incrementing the success count; and
    if a user answer is incorrect and incomplete, outputting for display on the user device, additional instructions to indicate missing information without incrementing the success count.

7. The computer-implemented method of claim 1, wherein the one or more data sources comprise one or more of: court records, birth certificate records, census bureau records, county records, property records, real estate records, court records, business records, school records, education records, webpages, professional license records, historical records, social media records, marketing records, publications, private records, media records, background records, proprietary data, and derived data records.

8. A computer-implemented method for user authentication for access to a service using a chatbot, the method comprising:

receiving user information corresponding to a user;

resolving the received user information to a unique identifier (UID) for the user;

obtaining, from one or more data sources, comprehensive skills-or-knowledge based data about the user that matches the UID;

generating a plurality of skills-or-knowledge based authentication questions based on the comprehensive skills-or-knowledge based data;

outputting for display on a user device, one or more of the plurality of the skills-or-knowledge based authentication questions;

receiving, in a natural language, one or more user answers corresponding to the one or more of the plurality of the skills-or-knowledge based authentication questions;

utilizing a large language model (LLM) to evaluate the one or more user answer against a known ground truth based on the comprehensive skills-or-knowledge based data; and responsive to determining that a success count corresponding to a number of factually correct user answers corresponding to the one or more of the plurality of the skills-or-knowledge based authentication questions matches a pre-defined threshold number of matches, authenticating the user for access to the service.

9. The computer-implemented method of claim 8, further comprising:

gathering user device data and behavioral data responsive to the user accessing an authentication page; and generating a digital profile associated with the user.

10. The computer-implemented method of claim 8, wherein generating the plurality of the skills-or-knowledge based authentication questions is further based on a pre-defined configuration.

11. The computer-implemented method of claim 8, wherein:

If a user answer is evaluated as factually correct, outputting for display on the user device, a next question and incrementing the success count;

if a user answer is evaluated as factually incorrect, outputting for display on the user device, a next question without incrementing the success count;

if a user answer is factually correct but incomplete, outputting for display on the user device, additional instructions to indicate missing information without incrementing the success count; and if a user answer is incorrect and incomplete, outputting for display on the user device, additional instructions to indicate missing information without incrementing the success count.

12. The computer-implemented method of claim 8, wherein the one or more data sources comprise one or more of: court records, birth certificate records, census bureau records, county records, property records, real estate records, court records, business records, school records, education records, webpages, professional license records, historical records, social media records, marketing records, publications, private records, media records, background records, proprietary data, and derived data records.

13. The computer-implemented method of claim 8, further comprising gathering user device and behavioral data responsive to the user accessing an authentication page to generate a digital profile associated with the user.

14. The computer-implemented method of claim 8, wherein the one or more skills-or-knowledge based authentication questions includes a photograph of an apparatus associated with the comprehensive skills-or-knowledge based data about the user that matches the UID.

15. The computer-implemented method of claim 8, wherein the one or more of the plurality of the skills-or-knowledge based authentication questions includes one or more open-ended questions.

16. A system for user authentication via a chatbot, the system comprising:

a data repository configured for storing user identification information;

a user interface configured for displaying authentication questions and receiving user answers from a user;

at least one memory for storing data and computer-executable instructions; and at least one processor configured to access the at least one memory and further configured to execute the computer-executable instructions that cause the at least one processor to:

receive user information corresponding to a user;

resolve the received user information to a unique identifier (UID) for the user;

obtain, from one or more data sources, comprehensive data about the user that matches the UID;

generate a plurality of authentication questions based on the comprehensive data;

output for display on a user device, one or more of the plurality of authentication questions;

receive, in a natural language, one or more user answers corresponding to the one or more of the plurality of authentication questions;

utilize a large language model (LLM) to evaluate the user answer against a known ground truth based on the comprehensive data;

output for display on the user device, an indication corresponding to the evaluation; and authenticate the user for access to a service responsive to determining that a success count corresponding to a number of factually correct user answers corresponding to the one or more of the plurality of authentication questions matches a pre-defined threshold number of matches.

17. The system of claim 16, wherein the plurality of authentication questions comprises one or more of open-ended questions, skills-based questions, and knowledge-based questions.

18. The system of claim 16, wherein the system is further configured to:

gather user device data and behavioral data responsive to the user accessing an authentication page; and generate a digital profile associated with the user.

19. The system of claim 16, wherein the authentication questions are further generated based on a pre-defined configuration.

20. The system of claim 16, wherein the system is further configured to output for display on the user device, a next question and increment the success count when a user answer is evaluated as factually correct;

output for display on the user device, a next question without incrementing the success count when a user answer is evaluated as factually incorrect;

output for display on the user device, additional instructions to indicate missing information without incrementing the success count when a user answer is factually correct but incomplete; and output for display on the user device, additional instructions to indicate missing information without incrementing the success count when a user answer is incorrect and incomplete.

* * * * *